United States Patent [19]
Yamamoto et al.

[11] Patent Number: 5,294,577
[45] Date of Patent: Mar. 15, 1994

[54] SEMICONDUCTOR CERAMIC COMPOSITION FOR SECONDARY ELECTRON MULTIPLIERS

[75] Inventor: Hiroshi Yamamoto, Kyoto; Junichi Nomura, Shiga; Hideaki Niimi, Shiga; Yasunobu Yoneda, Tekefu, all of Japan

[73] Assignee: Murata Manufacturing Co., Ltd., Japan

[21] Appl. No.: 82,048

[22] Filed: Jun. 24, 1993

[30] Foreign Application Priority Data

Jun. 25, 1992 [JP] Japan .................. 4-167400

[51] Int. Cl.$^5$ .......................... C04B 35/49
[52] U.S. Cl. ...................... 501/134; 252/520
[58] Field of Search .............. 501/134; 252/520

[56] References Cited

U.S. PATENT DOCUMENTS

| | | | |
|---|---|---|---|
| 3,612,946 | 10/1971 | Toyoda | 313/105 |
| 3,953,373 | 4/1976 | Matsuura et al. | 252/520 |
| 4,028,277 | 6/1977 | Matsuura et al. | 252/520 |
| 4,094,061 | 6/1978 | Gupta et al. | 252/520 |
| 4,172,922 | 10/1979 | Merz et al. | 252/520 |
| 4,305,744 | 12/1981 | Carette et al. | 65/32 |

Primary Examiner—Karl Group
Assistant Examiner—Deborah Jones
Attorney, Agent, or Firm—Ostrolenk, Faber, Gerb & Soffen

[57] ABSTRACT

A semiconducting ceramic composition for secondary electron multipliers consists essentially of 55 to 80 mol % of zinc oxide, 12 to 30 mol % of titanium oxide, and 0.2 to 20 mol % of nickel oxide.

2 Claims, 5 Drawing Sheets

SEMICONDUCTOR CERAMIC COMPOSITION FOR SECONDARY ELECTRON MULTIPLIERS

BACKGROUND OF THE INVENTION

1. Field of the Invention

The present invention relates to a semiconducting ceramic composition for secondary electron multipliers.

2. Description of the Prior Art

Up to now, there have been proposed various secondary electron multipliers employing a semiconductor ceramic material. For example, JP-B-48-18026 discloses a secondary electron multiplier comprising a cylindrical semiconducting ceramic body with electrodes provided thereon. JP-B-48-18029 discloses a secondary electron multiplier comprising a semiconducting ceramic plate having a pair of electrodes provided at opposed ends thereof and including several perforations formed therein perpendicular to both electrodes. JP-B-48-18030 discloses a secondary electron multiplier comprising a plurality of semiconducting ceramic tubes of a uniform length and bundled together.

Materials used in these electron multipliers are semiconducting ceramic compositions of a zinc titanate system. Examples are those consisting essentially of 72.5 mol % of ZnO and 27.5 mol % of $TiO_2$, and those consisting essentially of 72.5 mol % of ZnO, 27.5 mol % of $TiO_2$ and containing $Al_2O_3$ incorporated therein in an amount of 1.25 mol %. The resistivity of these compositions are $8 \times 10^6$ $\Omega$cm for the former, and $2.8 \times 10^6$ $\Omega$cm for the latter, respectively. These semiconducting ceramic materials of the prior art have been applied to secondary electron multipliers used for the purpose of detecting a slight amount of charged particles.

However, the above semiconducting ceramic materials can not be applied to secondary electron multipliers to be used for detecting charged particles in a wide range of current because of their negative temperature coefficient of resistance.

Recently, there is an increasing demand for detection of charged particles in a range of from a slight amount to a large amount with one detector. To this end, the secondary electron multipliers are required to have a wide range of proportionality of input current to output current. In general, it is said that in an output current taken out from the secondary electron multipliers of a channel type, which increases linearly with the input current, is about 10% of the current of an multiplier element, that is, the current flowing through the electron multiplier element. In order to increase the output current, it is required to increase the current flowing through the multiplier element. If the multiplier elements are so designed as to have a wide dynamic range, that is, to have a greatly low resistance, they are self-heated as a result of current flowing through it. Thus, the resistance of the element decreases because of the negative temperature coefficient of resistance (as temperature increases, resistance decreases), which in turn causes increase of heat generation, resulting in thermal running away of the elements. Thus, making it impossible to retain a high voltage applied.

SUMMARY OF THE INVENTION

It is therefore an object of the present invention to provide a semiconducting ceramic composition for secondary electron multipliers, which is high in the magnitude of secondary emission yield $\delta$, and which has a positive or considerably small temperature coefficient of resistance.

Another object of the present invention is to provide a secondary electron multiplier which is stable in operation and which is small in resistance and has no fear of occurrence of thermal running away regardless of its small resistance.

The above and other objects of the present invention are achieved by providing a semiconducting ceramic composition for secondary electron multipliers, consisting essentially of 55 to 80 mol % of zinc oxide, 12 to 30 mol % of titanium oxide, and 0.2 to 20 mol % of nickel oxide.

Incorporation of nickel oxide into a semiconducting ceramic composition of a zinc oxide-titanium oxide system causes increase in resistivity and gain, and makes the temperature coefficient of resistance positive or zero. This makes it possible to produce secondary electron multipliers with a considerably low resistance that operates with stably in vacuum without causing thermal running away.

The composition of the present invention has been limited to those falling in the above range for the following reasons: If the content of nickel oxide is less than 0.2 mol %, desired effects are scarcely obtained. If the content of nickel oxide exceeds 20 mol %, the resistivity becomes lowered.

BRIEF DESCRIPTION OF THE DRAWINGS

These and other objects and features of the present invention will become clear from the following description taken in conjunction with the preferred embodiments thereof with reference to the accompanying drawings, throughout which like parts are designated by like reference numerals, and in which.

EXAMPLE

Using zinc oxide, nickel oxide and titanium oxide as raw materials, there were prepared semiconducting ceramic bodies in the following manner: The raw materials were weighed and mixed together to produce semiconducting ceramics having a composition shown in Table 1. The resultant mixture was put into a polyethylene-lined pot mill along with agate balls and a suitable amount of pure water, and then milled by the wet process for 20 hours. After dehydration and drying, the mixture was grounded to particle sizes in the range of 50 to 200 meshes.

The resultant powder was plasticized by addition of a binder composed of paraffin and a wheat flour paste, and then extruded to form tubular bodies. The tubular bodies were arranged on a powder of said mixed raw materials overlaid on an alumina sager, and fired in the atmosphere at a temperature shown in Table 1 for about 1 hour to prepare tubular semiconducting ceramic bodies with 2.0 mm (outer diameter) by 1.0 mm (inner diameter) by 50.0 mm (length).

For each specimen of the tubular semiconducting ceramic body, measurements were made on resistivity, gain of multiplications and temperature characteristics of resistance. Results are shown in Table 1.

The resistivity was determined as a resistivity at ordinary temperature by applying a DC voltage of 30 V/mm at room temperature.

Figure 1:
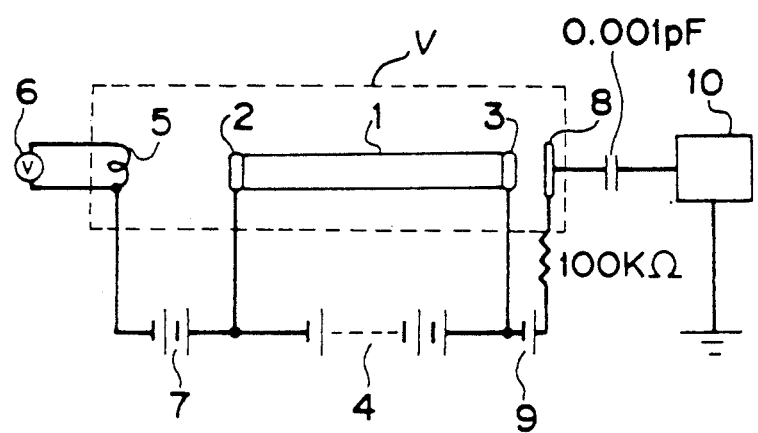
FIG. 1 is a diagram showing an experimental circuit used for measurement of gain for secondary electron multipliers.

The gain of multiplications was determined in the following manner: Firstly, the tubular semiconducting ceramic body 1 is placed in a vacuum chamber V and then included in an electrical circuit as shown in FIG. 1 along with other electrical parts such as a DC power source 4, a filament 5, a power source 6, an accelerating power source 7, a collector 8, a power source 9, and an electronic counter 10. After reducing the pressure in vacuum chamber V to $1.0 \times 10^{-6}$ Torr, electrons emitted from the filament 5 are introduced into the tubular semiconducting ceramic body 1 under a DC voltage of 3 kV and an electron acceleration voltage of 200 V. At the same time, secondary electrons emitted from the inner surface of the ceramic body 1 are collected by the collector 8 and counted as the number of pulses by the electronic counter 10 to determine the gain.

Figure 9:
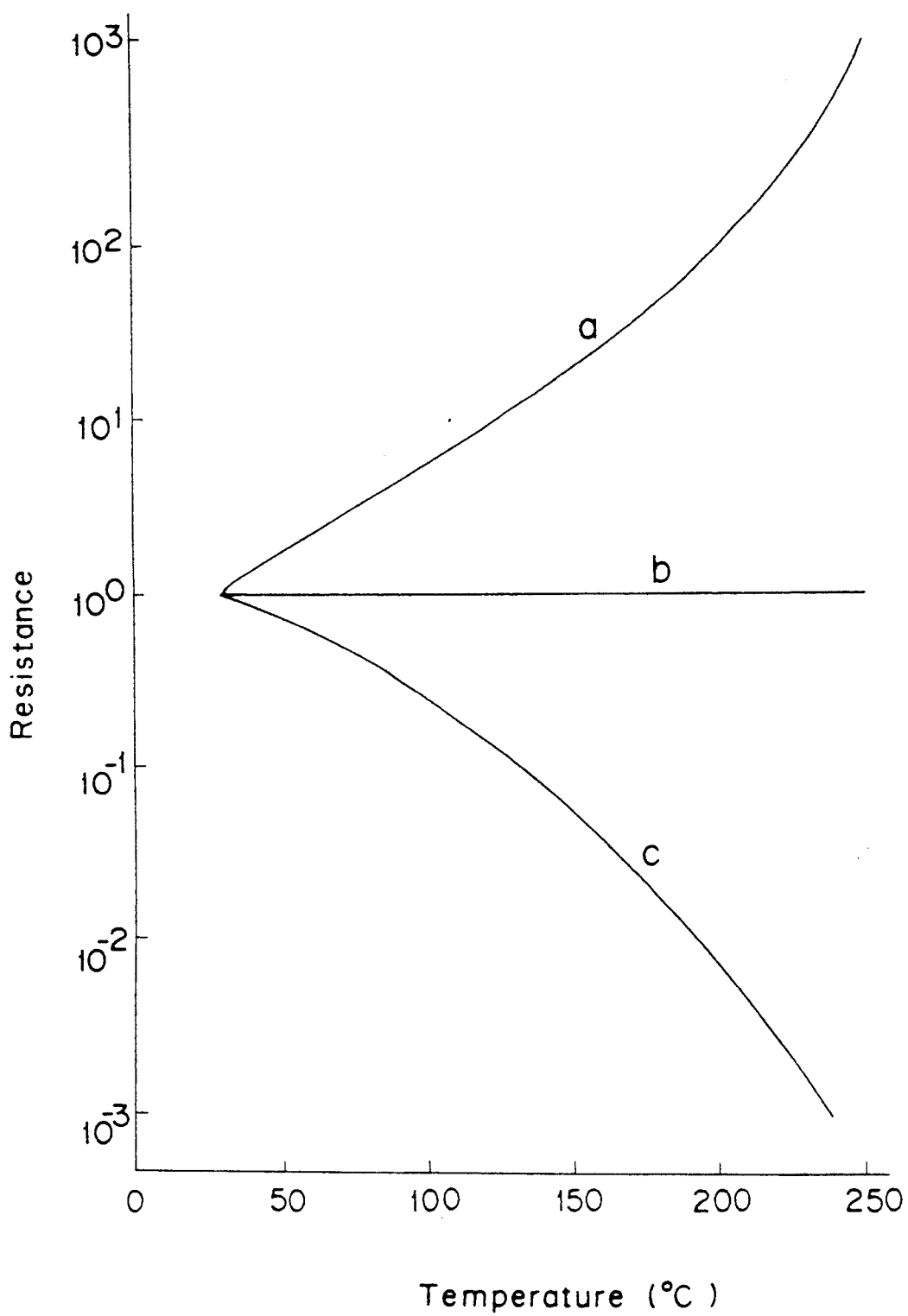
FIG. 9 is a graph showing variation of resistance of the secondary electron multiplier as a function of temperature.

The temperature characteristic of resistance was determined by placing the specimen in a thermostat, heating it step by step from room temperature, and applying a voltage of 30 V/mm at every 10° C. to determine the resistivity of the specimen at various temperatures. The data for each specimen are plotted as a function of temperature to determine a characteristic curve as shown in FIG. 9. Results are shown in Table 1, in which a symbol (a) means that the specimen has a temperature characteristic of resistance such that the resistance thereof increases with temperature, a symbol (b) means that the specimen has a temperature characteristic of resistance such that the resistance thereof scarcely changes with temperature, and a symbol (c) means that the specimen has a temperature characteristic of resistance such that the resistance thereof decreases with temperature.

| No. | Main Composition (Mol %) ZnO | TiO$_2$ | NiO | Firing Temp. (°C.) | Resistivity (Ω · cm) | Gain at 3 KV | Characteristic curve |
|---|---|---|---|---|---|---|---|
| 1 | 74 | 26 | 0 | 1380 | $2.8 \times 10^5$ | $2.0 \times 10^6$ | c |
| 2 | 55 | 31 | 14 | 1330 | ∞ | | |
| 3 | 55 | 28 | 17 | 1330 | $6.3 \times 10^8$ | $2.5 \times 10^8$ | a |
| 4 | 55 | 25 | 20 | 1320 | $3.8 \times 10^8$ | $3.3 \times 10^6$ | a |
| 5 | 60 | 32 | 8 | 1360 | ∞ | | |
| 6 | 60 | 29 | 11 | 1360 | $1.5 \times 10^9$ | $2.1 \times 10^6$ | a |
| 7 | 60 | 26 | 14 | 1320 | $7.7 \times 10^8$ | $2.8 \times 10^6$ | a |
| 8 | 60 | 23 | 17 | 1320 | $3.4 \times 10^8$ | $3.1 \times 10^6$ | a |
| 9 | 60 | 20 | 20 | 1320 | $9.2 \times 10^7$ | $3.0 \times 10^6$ | a |
| 10 | 60 | 17 | 23 | 1300 | $4.6 \times 10^7$ | $3.2 \times 10^6$ | c |
| 11 | 65 | 32 | 3 | 1360 | ∞ | | |
| 12 | 65 | 30 | 5 | 1360 | $1.1 \times 10^9$ | $1.5 \times 10^6$ | b |
| 13 | 65 | 27 | 8 | 1360 | $8.7 \times 10^8$ | $2.4 \times 10^6$ | b |
| 14 | 65 | 24 | 11 | 1360 | $1.3 \times 10^8$ | $3.2 \times 10^6$ | a |
| 15 | 65 | 21 | 14 | 1320 | $2.4 \times 10^7$ | $2.8 \times 10^6$ | a |
| 16 | 65 | 18 | 17 | 1320 | $6.7 \times 10^6$ | $2.4 \times 10^6$ | a |
| 17 | 65 | 15 | 20 | 1320 | $4.0 \times 10^5$ | $3.6 \times 10^6$ | a |
| 18 | 65 | 12 | 23 | 1300 | $3.8 \times 10^4$ | $3.2 \times 10^6$ | c |
| 19 | 70 | 27 | 3 | 1360 | $3.6 \times 10^4$ | $1.0 \times 10^6$ | b |
| 20 | 70 | 25 | 5 | 1360 | $8.7 \times 10^7$ | $2.1 \times 10^6$ | b |
| 21 | 70 | 22 | 8 | 1360 | $2.5 \times 10^7$ | $3.0 \times 10^6$ | b |
| 22 | 70 | 19 | 11 | 1320 | $8.9 \times 10^6$ | $3.2 \times 10^6$ | a |
| 23 | 70 | 16 | 14 | 1320 | $1.5 \times 10^6$ | $4.5 \times 10^6$ | a |
| 24 | 70 | 13 | 17 | 1320 | $9.6 \times 10^6$ | $3.8 \times 10^6$ | a |
| 25 | 70 | 10 | 20 | 1320 | Voltage inapplicable | | |
| 26 | 75 | 21.9 | 0.1 | 1360 | $7.6 \times 10^7$ | $1.8 \times 10^6$ | c |
| 27 | 75 | 21.8 | 0.2 | 1360 | $8.7 \times 10^7$ | $1.4 \times 10^6$ | a |
| 28 | 75 | 22 | 3 | 1360 | $9.0 \times 10^7$ | $2.6 \times 10^6$ | b |
| 29 | 75 | 20 | 5 | 1360 | $4.3 \times 10^7$ | $3.1 \times 10^6$ | b |
| 30 | 75 | 17 | 8 | 1360 | $1.2 \times 10^7$ | $2.8 \times 10^6$ | b |
| 31 | 75 | 14 | 11 | 1320 | $8.9 \times 10^6$ | $4.2 \times 10^6$ | a |
| 32 | 75 | 11 | 14 | 1320 | $1.0 \times 10^4$ | $5.3 \times 10^6$ | a |
| 33 | 75 | 8 | 17 | 1320 | Voltage inapplicable | | |
| 34 | 80 | 17 | 3 | 1360 | $8.7 \times 10^5$ | $9.5 \times 10^5$ | b |
| 35 | 80 | 15 | 5 | 1360 | $3.3 \times 10^5$ | $2.8 \times 10^6$ | b |

As will be understood from the results shown in Table 1, the semiconducting ceramic composition of the present invention makes it possible to produce secondary electron multipliers having a positive or flat temperature characteristic of resistance over a wide range of temperature. Thus, it is possible to operate the secondary electron multipliers even at a high temperature of 100° to 200° C. in vacuum for a long time without causing thermal running away even if the resistance thereof is reduced to 1/10 times of that of the secondary electron multipliers of the prior art.

Also, it is possible to produce secondary electron multipliers which provides a high gain and a wide dynamic range. Since the secondary electron multipliers employing the composition of the present invention have a wide linearity which is greater than by a factor of 10 as compared with that of the prior art, it is possible to widen applications. Since the composition of the present invention makes it possible to reduce resistance of secondary electron multipliers, the surface of the secondary electron multipliers can be kept clean for a long time as the resistance, which in turn makes it possible to produce secondary electron multipliers with long life, In the above embodiment, raw materials are used in an oxide form, but they may be used in the form of any other compounds provided that it is converted into an oxide by firing. Typical compounds to be used as raw materials include inorganic compounds such as carbonates, hydroxides, nitrates, chlorides and the like, and organic compounds such as carboxylic acid salts, alcohoxides and the like. Also, there is no need to incorporate nickel oxide into a mixture of raw materials. Nickel may be incorporated into a sintered body of a basic composition composed of zinc oxide and titanium oxide. In this case, a semiconducting ceramic composition of the present invention may be prepared by mixing zinc oxide and titanium oxide in a predetermined molar ratio, forming the resultant mixture into a desired shape, calcining the resultant green body, immersing the calcined body in a solution of a nickel compound to allow the nickel ions to penetrate into the calcined body, and then sintering the calcined body.

In the above embodiment, the secondary electron multiplier is formed into a cylinder as shown in FIG. 1, but it may have any other configurations as shown in FIGS. 2 to 8.

Figure 2:
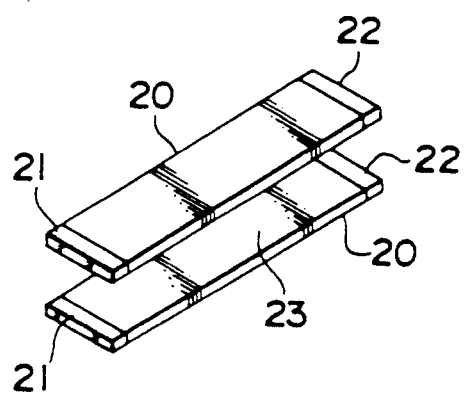
FIG. 2 is a perspective view illustrating a structure of a secondary electron multiplier employing a ceramic semiconductor according to the present invention.

Referring now to FIG. 2, there is shown another form of a secondary electron multiplier comprising a pair of semiconducting ceramic plates 20. The semiconducting ceramic plates 20 are provided on both ends thereof with a pair of electrodes 21 and 22 and arranged in parallel to form a channel 23 between them. The surfaces of the semiconducting ceramic plates 20 standing opposite each other are partially or wholly kept bare to form a channel extending from one end of the plates to the opposite end. Other parts of the plates 20 may be insulated by an insulating film coated thereon. Also, the semiconducting ceramic plates 20 may be provided with one or more additional electrodes on the surface of each plate 20 between two electrodes 21 and 22 as occasion demands. This makes it possible to improve the efficiency of multiplication.

Figure 3:
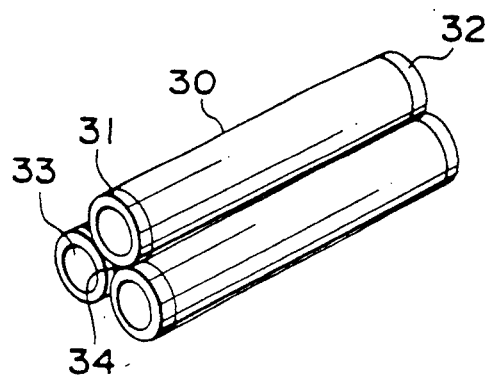
FIG. 3 is a perspective view illustrating another form of a secondary electron multiplier employing a ceramic semiconductor according to the present invention.

A secondary electron multiplier shown in FIG. 3 comprises a bundle of semiconducting ceramic unit tubes 30 each having a pair of electrodes 31 and 32 and a bore 33 serving as a path for electrons. In this case, a gap 34 surrounded by the neighboring tubes 30 serves as a path for electrons and the outer surfaces of the tubes 30 are utilized as a secondary emitter surface as well as inner surfaces of the tubes 30 since the whole tubes 30 are made of a ceramic semiconductor with a function to perform multiplication of electrons.

Figure 4:
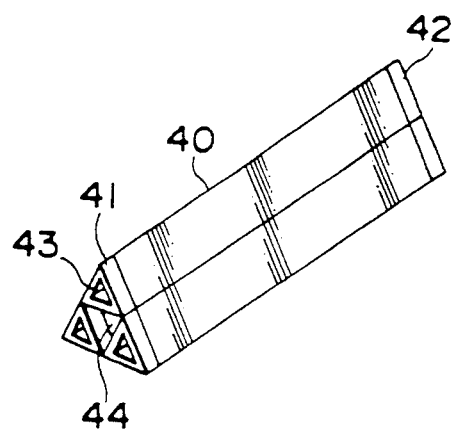
FIG. 4 is a perspective view illustrating still another form of a secondary electron multiplier employing a ceramic semiconductor according to the present invention.

A secondary electron multiplier shown in FIG. 4 comprises a bundle of hollow semiconducting ceramic bodies 40 each having a configuration of a triangular prism and being provided with a pair of electrodes 41 and 42 on both ends thereof. The prisms 40 are so arranged as to form a triangular space 44 sided by the neighboring three prisms 40. Thus, the three sides of the space 44 form a path for secondary electrons and can be utilized as a secondary emitter surface as well as the inner walls of the prisms 40.

Figure 5:
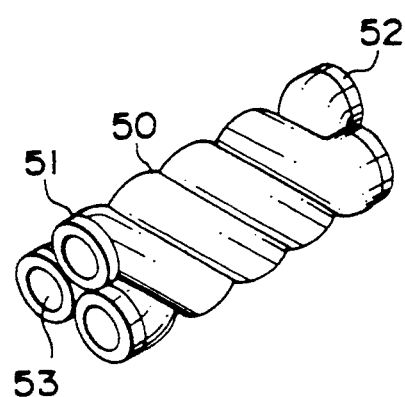
FIG. 5 is a perspective view illustrating still another form of a secondary electron multiplier employing a ceramic semiconductor according to the present invention.

A secondary electron multiplier shown in FIG. 5 comprises three tubular semiconducting ceramic bodies 50 twisted together. Each tubular semiconducting ceramic body 50 is provided with electrodes 51 and 52 on both ends thereof. The use of the secondary electron multiplier having such a structure makes it possible to control positive feedback of oppositely polarized particles (for example, positively charged electrical particles with respect to incident electrons) from a collector as compared with the secondary electron multiplier having a linear structure of FIG. 1. Further, this secondary electron multiplier makes it possible to extend an effective length of a path 53 as compared with the length of appearance thereof as well as to improve the gain of secondary electron multiplication.

Figure 6:
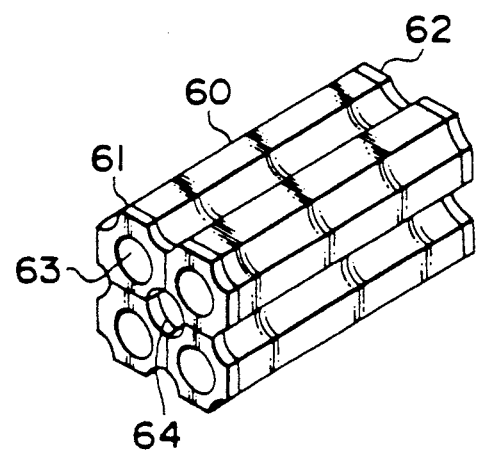
FIG. 6 is a perspective view illustrating still another form of a secondary electron multiplier employing a ceramic semiconductor according to the present invention.

A secondary electron multiplier shown in FIG. 6 comprises a bundle of hollow semiconducting ceramic bodies 60 each having a configuration of an octagonal prism and being provided with a pair of electrodes 61 and 62 on both ends thereof. Each ceramic body 60 is provided in its every other side with a groove having a cross section of a quarter circle and extending in the direction parallel to the axis of the ceramic body 60 along the entire length thereof. Thus, the neighboring ceramic bodies 60 bundled together form a cylindrical space 64 with a uniform diameter and the outer walls of the ceramic bodies 60 that form the space 64 can be utilized as a secondary emitter surface. Thus, such a structure is used for electron multipliers, especially for image multiplication tubes which require uniformity and regularity of picture elements. The above hollow semiconducting ceramic bodies 60 may be twisted together, like as that of FIG. 5, as occasion demands.

Figure 7:
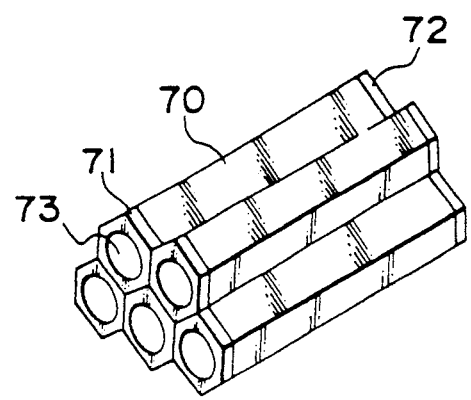
FIG. 7 is a perspective view illustrating still another form of a secondary electron multiplier employing a ceramic semiconductor according to the present invention.

A secondary electron multiplier shown in FIG. 7 comprises a bundle of hollow semiconducting ceramic bodies 70 each having a configuration of a hexagonal prism and being provided with a pair of electrodes 71 and 72 and a through-hole 73. The ceramic bodies 70 are bundled together so that no gap is formed between them. The hollow semiconducting ceramic bodies 70 may be twisted together, like as that of FIG. 5, as occasion demands.

Figure 8:
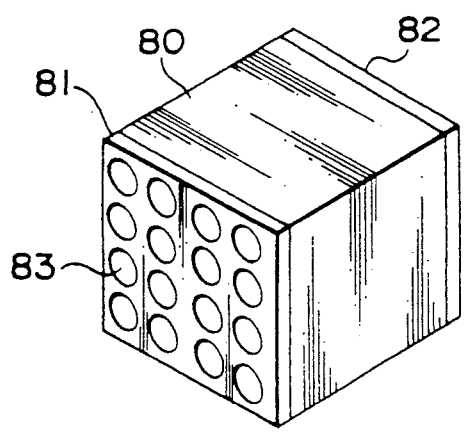
FIG. 8 is a perspective view illustrating still another form of a secondary electron multiplier employing a ceramic semiconductor according to the present invention.

A secondary electron multiplier shown in FIG. 8 comprises a semiconducting ceramic body 80 having a configuration of a regular solid and being provided with a plurality of through-holes 83 passing therethrough in the direction perpendicular to electrodes 81 and 82 deposited on both ends thereof.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A semiconducting ceramic composition for secondary electron multipliers, consisting essentially of 55 to 80 mol % of zinc oxide, 12 to 30 mol % of titanium oxide, and 0.2 to 20 mol % of nickel oxide.

2. The semiconducting ceramic composition for secondary electron multipliers according to claim 1, wherein said composition consists essentially of 60 to 70 mol % of ZnO, 20 to 29 mol % of $TiO_2$, and 5 to 20 mol % of NiO.

* * * * *